United States Patent
Pu et al.

(10) Patent No.: US 8,625,263 B2
(45) Date of Patent: Jan. 7, 2014

(54) PORTABLE COMPUTER HAVING DETACHABLE WIRELESS KEYBOARD

(75) Inventors: Hong-Liang Pu, Shenzhen (CN); Yong-Feng Zhao, Shenzhen (CN); Fu Liao, Shenzhen (CN); Yong-Jun Gu, Shenzhen (CN); Ren-Qian Liu, Shenzhen (CN); Ming-Chang Lee, New Taipei (TW)

(73) Assignees: Hong Fu Jin Precision Industry (ShenZhen) Co., Ltd, Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 211 days.

(21) Appl. No.: 13/237,970

(22) Filed: Sep. 21, 2011

(65) Prior Publication Data
US 2013/0021735 A1    Jan. 24, 2013

(30) Foreign Application Priority Data
Jul. 18, 2011  (CN) .......................... 2011 1 0200500

(51) Int. Cl.
*G06F 1/16*    (2006.01)

(52) U.S. Cl.
USPC ......... 361/679.17; 248/533; 16/352; 362/248

(58) Field of Classification Search
USPC ............ 248/316.1, 500, 533, 223.31, 225.11;
16/380, 386, 352; 362/253, 85, 248;
361/679.17, 679.09, 679.55, 679.03,
361/679.26, 679.27, 679.46, 679.29,
361/679.31, 752; 365/185.05, 185.14,
365/185.19, 185.28
See application file for complete search history.

(56) References Cited

U.S. PATENT DOCUMENTS

| | | | | |
|---|---|---|---|---|
| 2009/0257228 A1* | 10/2009 | Hsieh | ............................ | 362/253 |
| 2011/0026210 A1* | 2/2011 | Tracy et al. | .............. | 361/679.17 |
| 2011/0310571 A1* | 12/2011 | Murakami | .................... | 361/752 |

* cited by examiner

*Primary Examiner* — Hung Duong
(74) *Attorney, Agent, or Firm* — Altis Law Group, Inc.

(57) ABSTRACT

A portable computer includes a main body, a display, and a wireless keyboard. The main body includes a keyboard supporting panel. The display is hinged to the main body. The wireless keyboard detachably attached on the keyboard supporting panel. The wireless keyboard is mechanically coupled to the main body and wirelessly communicatively coupled to the main body.

12 Claims, 7 Drawing Sheets

PORTABLE COMPUTER HAVING DETACHABLE WIRELESS KEYBOARD

BACKGROUND

1. Technical Field

The present disclosure relates to a portable computer, especially related to a portable computer having a detachable wireless keyboard.

2. Description of Related Art

A keyboard for a portable computer is usually integrated into the computer as a unitary body. Therefore the keyboard may not be used as an independent input device.

What is needed, therefore, is a portable computer having detachable wireless keyboard.

BRIEF DESCRIPTION OF THE DRAWINGS

Many aspects of the present portable computer can be better understood with reference to the following drawings. The components in the drawings are not necessarily drawn to scale, the emphasis instead being placed upon clearly illustrating the principles of the present portable computer. Moreover, in the drawings, like reference numerals designate corresponding parts throughout the views.

DETAILED DESCRIPTION

Figure 1:
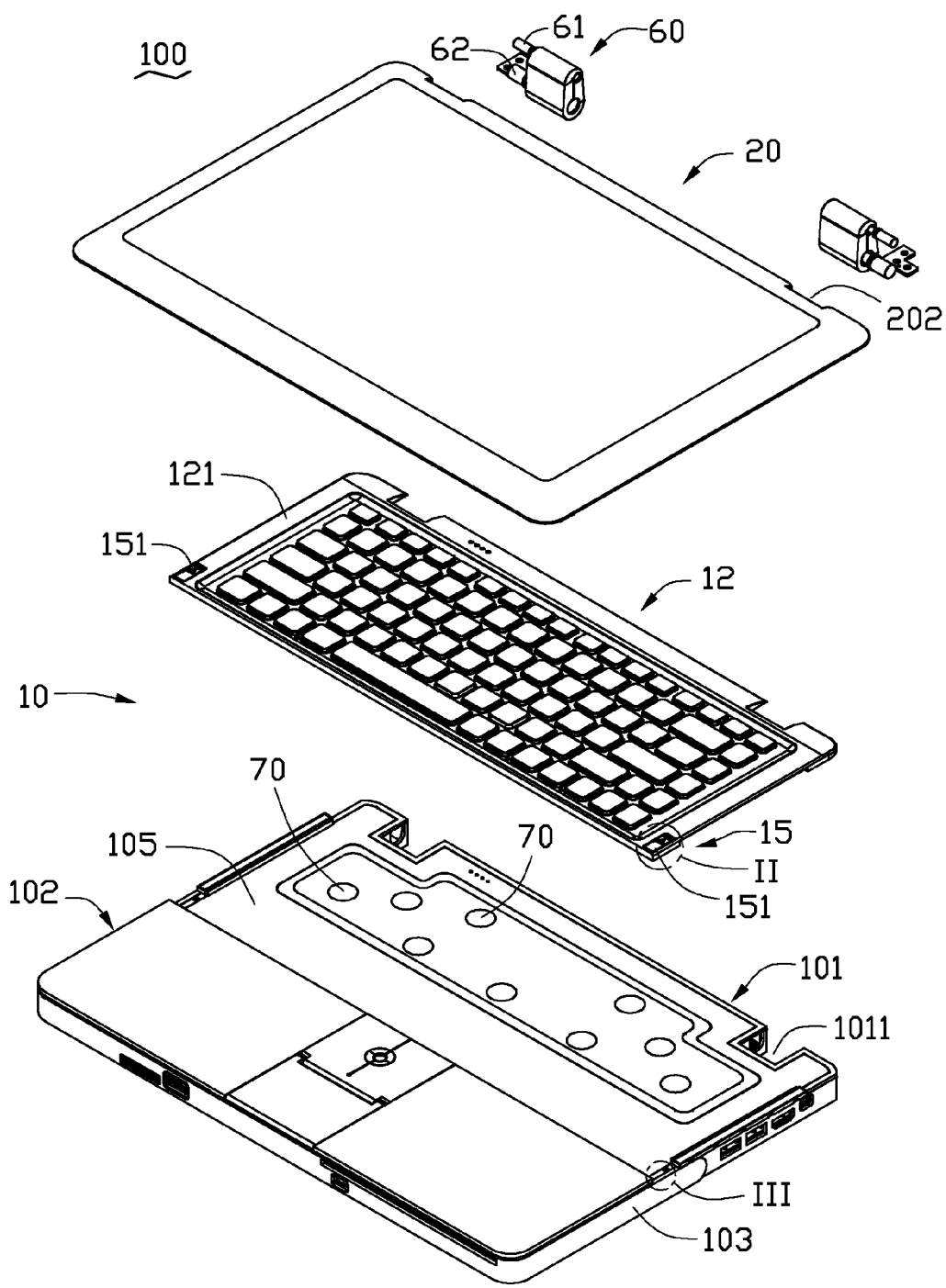
FIG. 1 is an exploded view of a portable computer with a display, a keyboard, and a main body, provided by an exemplary embodiment.
Figure 2:
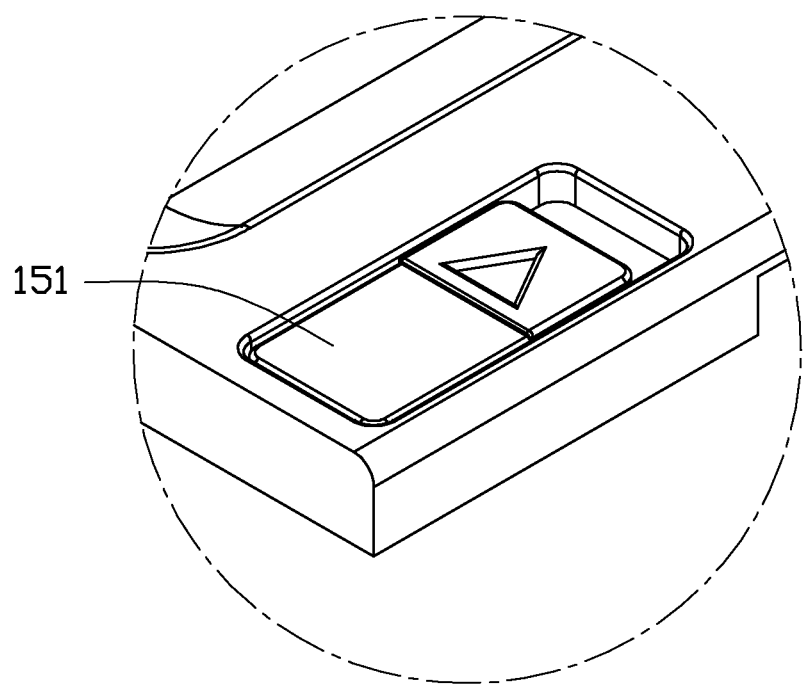
FIG. 2 is an enlarged view of a circled part II of FIG. 1, showing a button.
Figure 3:
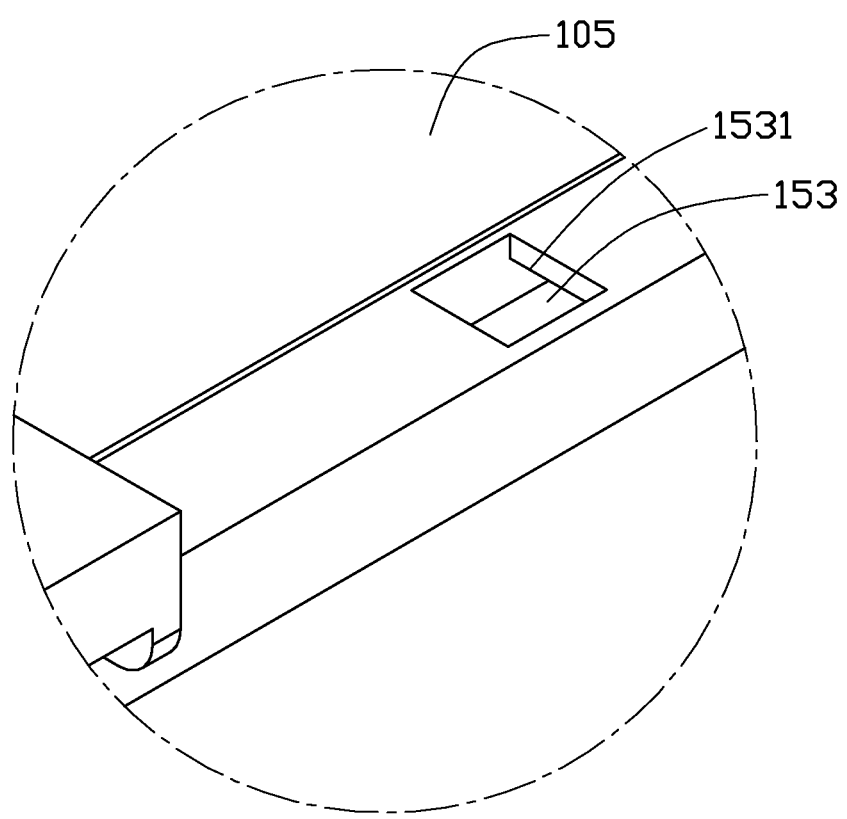
FIG. 3 is an enlarged view of a circled part III of FIG. 1, showing an engaging hole corresponding to the button of FIG. 2.

Referring to FIG. 1, a portable computer 100 provided by an exemplary embodiment of the present disclosure includes a main body 10 and a display 20. The main body 10 is a host of the portable computer 100. The main body 10 includes a front end 101, a left surface 102, and a right surface 103. The front end 101 is opposite to a user of the portable computer 100. The display 20 is hinged to the main body 10 at the front end 101. Connection interfaces such as USB interface, microphone can be set in the left surface 102 and the right surface 103.

The portion surrounded by the front end 101, the left surface 102, and the right surface 103 is a control panel. The control panel defines a keyboard supporting panel 105, adjacent to the front end 101. The supporting panel 105 is made of plastic, and supports a wireless keyboard 12. The supporting panel 105 and the wireless keyboard 12 have substantially the same size. A main board (not shown) is located under the supporting panel 105.

The keyboard 12 includes a keypad and a case 121 received the keypad therein. There are various keys located at the keypad. The case 121 has a bottom panel 122 (labeled in FIG. 4). The keyboard 12 is wirelessly connected to the main body 10 by a known method such as Wireless USB or Bluetooth. A battery (not shown) inside of the keyboard 12 adjacent to the front end 101 is used to power the keyboard 12.

The keyboard 12 is mechanically coupled to the main body 10, or magnetically attached to the supporting panel 105, or by both.

Referring to FIGS. 2 to 5, the portable computer 100 includes a locking unit 15 to couple the keyboard 12 to the main body 10. The locking unit 15 includes at least one button 151, at least one hooks 152, and at least one engaging holes 153 for engaging with the hooks 152. In this embodiment, there are two buttons 151, two hooks 152, and two corresponding engaging holes 153. The buttons 151 are formed on the case 121. Each button 151 has a back surface 1510. One hook 152 is connected to the back surface 1510. The button 151 is manually movable relative to the keyboard 12 between a locking position and a free position. The locking position means the hook 152 is engaged in the engaging hole 153 and the keyboard 12 is fixed to the main body 10. The free position means the hook 152 is disengaged from the engaging hole 153 and the keyboard 12 is directly detachable from the main body 10.

In this embodiment, each hook 152 includes a front end 1521 and a first bar 1522 substantially perpendicularly connected with the front end 1521. The first bar 1522 is extending toward the bottom of the keyboard 12. Each engaging hole 153 includes a second bar 1531 extending from the supporting panel 105 toward a bottom of the main body 10. When the buttons 151 are pushed toward the front end 101, the front end 1521 is pushed beneath and pressed by the second bar 1531, thus the keyboard 12 is locked. When the buttons 151 are pulled backward, the first bar 1522 moves away from the second bar 1531. The keyboard 12 may be lifted and detached from the supporting panel 105.

Figure 4:
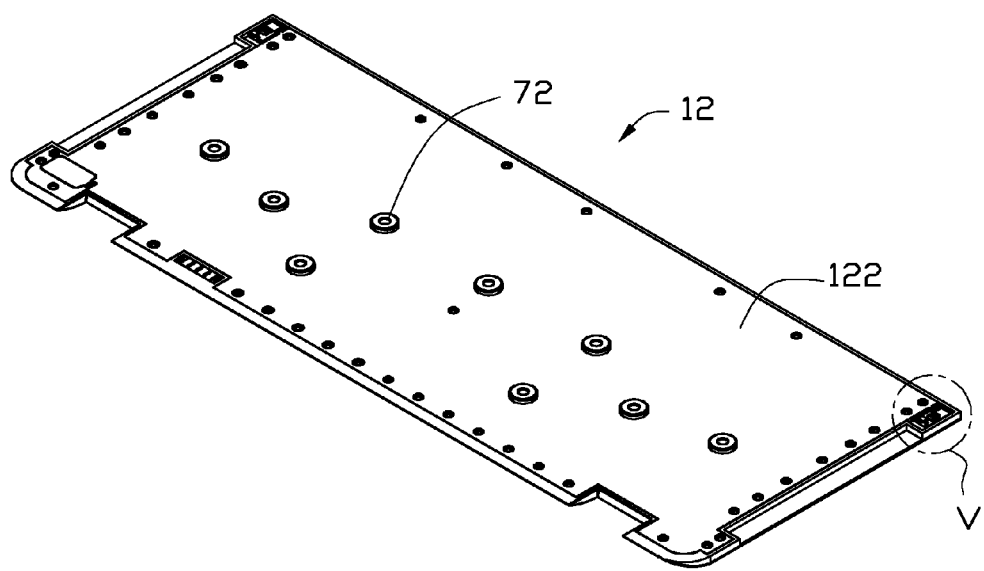
FIG. 4 is the keyboard of FIG. 1, showing a bottom panel.
Figure 5:
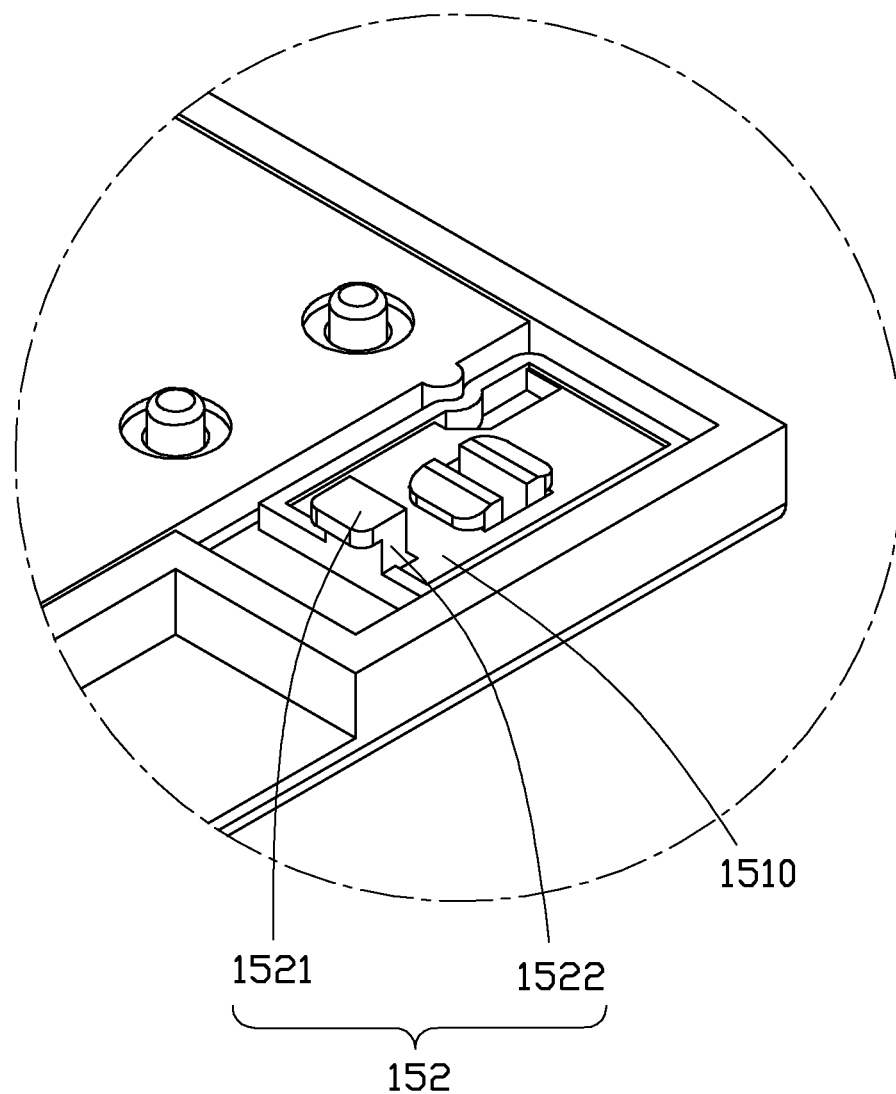
FIG. 5 is an enlarged view of part V of the FIG. 4.

Referring to FIGS. 1 and 4, at least one first magnetic member 70 may be applied on the keyboard panel 105, and at least one corresponding second magnetic member 72 is located at the bottom panel 122. The magnetic attracting force between the keyboard panel 105 fixes the keyboard 12 on the main body 10, and it is easy to detach the keyboard 12 from the supporting panel 105 by lifting the keyboard 12.

The first magnetic member 70 is an iron disk, and the second magnetic member 72 is a magnet disk having the same size and shape as the first magnetic member 70.

Figure 6:
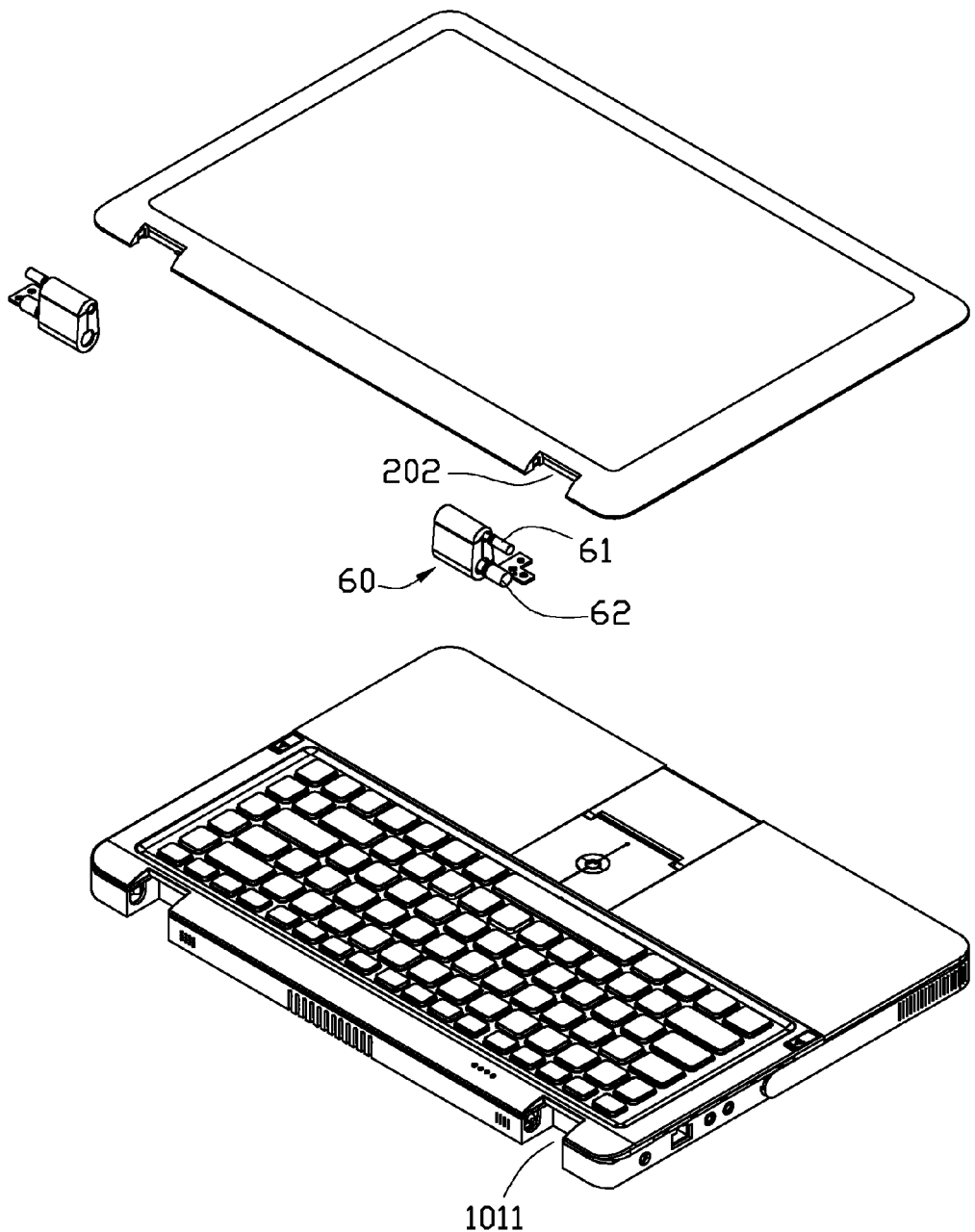
FIG. 6 is a schematic view of the portable computer of FIG. 1 with the display and the main body separated.
Figure 7:
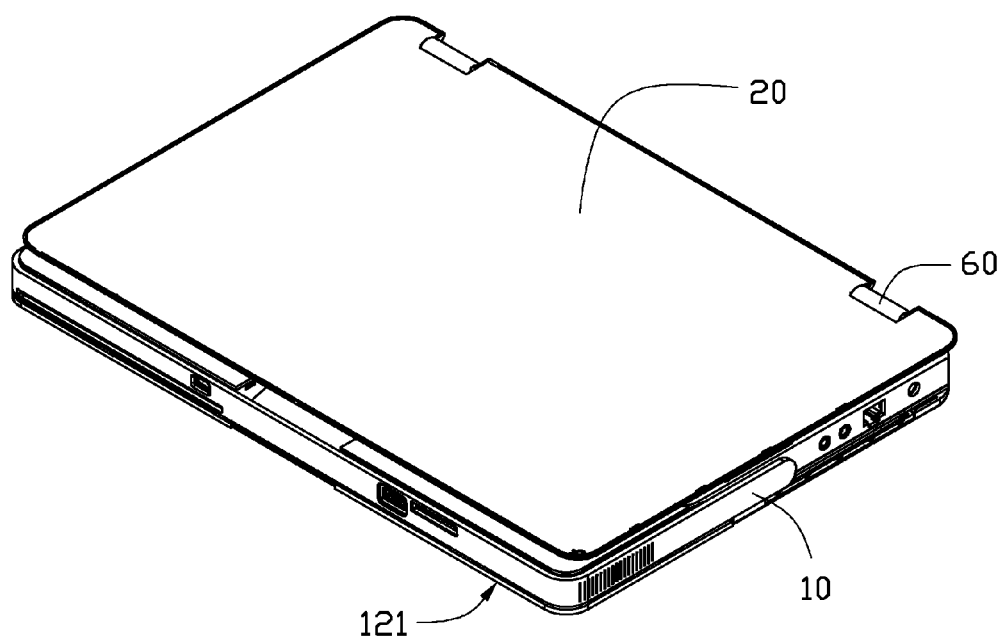
FIG. 7 shows another state of the portable computer of FIG. 1.

Referring to FIGS. 1, 6, and 7, the display 20 is hinged to the main body 10 by at least one dual-axis hinge 60. In this embodiment, there are two dual-axis hinges 60. Each dual-axis hinge 60 includes a first axle 61 and a second axle 62. The first and second axles 61 and 62 are parallel to each other. Two corresponding first accommodating grooves 202 are located at the hinging end of the display 20. Additionally, two second accommodating grooves 1011 located at the front end 101. The two first axles 61 are respectively located in the two first accommodating grooves 202, so that the display 20 may rotate at most 180 degrees around the first axles 61. The two second axles 62 are respectively located in the two second accommodating grooves 1011, so that the main body 10 may rotate at most 180 degrees around the second axles 62. The back surfaces of the main body 10 and the display 20 may contact with each other, therefore the portable computer 100 may be used as a tablet computer.

It is understood that the above-described embodiments are intended to illustrate rather than limit the disclosure. Variations may be made to the embodiments without departing from the spirit of the disclosure. Accordingly, it is appropriate that the appended claims be construed broadly and in a manner consistent with the scope of the disclosure.

What is claimed is:

1. A portable computer comprising:
a main body having a keyboard supporting panel;
a display hinged to the main body;
a wireless keyboard detachably attached on the keyboard supporting panel, the wireless keyboard mechanically coupled to the main body and wirelessly communicatively coupled to the main body; and
a locking unit, wherein the locking unit comprises a button formed on the keyboard, a hook connected to the button, and an engaging hole defined in the supporting panel for engaging with the hook; the button is manually movable relative to the keyboard between a locking position where the hook is engaged in the engaging hole, and the keyboard is fixed to main body, and a free position where the hook is disengaged from the engaging hole, and the keyboard is directly detachable from the supporting panel.

2. The portable computer of claim 1, wherein the keyboard contains a battery therein.

3. The portable computer of claim 1, wherein the keyboard comprises a keypad having a plurality of keys and a case receiving the keypad therein, the case has a bottom panel facing the keyboard supporting panel.

4. The portable computer of claim 3, wherein the keyboard is magnetically attached to the main body.

5. The portable computer of claim 1, further comprising a plurality of dual-axis hinges, wherein the display is hinged to the main body through the dual-axis hinges, each dual-axis hinge comprises a first axle and a second axle parallel to the first axle.

6. The portable computer of claim 5, wherein the main body further comprises two first accommodating grooves, and the display comprises two second accommodating grooves, the first axles are received in the second accommodating grooves, so that the display is rotatable 180 degrees around the first axles; the second axles are received in the first accommodating grooves, so that the main body is rotatable 180 degrees around the second axles.

7. A portable computer comprising:
a main body having a keyboard supporting panel;
a display hinged to the main body;
a wireless keyboard detachably attached on the keyboard supporting panel, the wireless keyboard mechanically coupled to the main body and wirelessly communicatively coupled to the main body; and
a plurality of dual-axis hinges, wherein the display is hinged to the main body through the dual-axis hinges, each dual-axis hinge comprises a first axle and a second axle parallel to the first axle.

8. The portable computer of claim 7, wherein the main body further comprises two first accommodating grooves, and the display comprises two second accommodating grooves, the first axles are received in the second accommodating grooves, so that the display is rotatable 180 degrees around the first axles; the second axles are received in the first accommodating grooves, so that the main body is rotatable 180 degrees around the second axles.

9. The portable computer of claim 7, further comprising a locking unit, wherein the locking unit comprises a button formed on the keyboard, a hook connected to the button, and an engaging hole defined in the supporting panel for engaging with the hook; the button is manually movable relative to the keyboard between a locking position where the hook is engaged in the engaging hole, and the keyboard is fixed to main body, and a free position where the hook is disengaged from the engaging hole, and the keyboard is directly detachable from the supporting panel.

10. The portable computer of claim 7, wherein the keyboard contains a battery therein.

11. The portable computer of claim 7, wherein the keyboard comprises a keypad having a plurality of keys and a case receiving the keypad therein, the case has a bottom panel facing the keyboard supporting panel.

12. The portable computer of claim 7, wherein the keyboard is magnetically attached to the main body.

* * * * *